(12) United States Patent
Kopp et al.

(10) Patent No.: US 8,693,816 B2
(45) Date of Patent: Apr. 8, 2014

(54) NANOPHOTONIC OPTICAL DUPLEXER

(75) Inventors: Christophe Kopp, Fontanil-Cornillon (FR); Stéphane Bernabe, Moirans (FR); Philippe Grosse, Sassenage (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 258 days.

(21) Appl. No.: 13/270,664

(22) Filed: Oct. 11, 2011

(65) Prior Publication Data
US 2012/0087621 A1    Apr. 12, 2012

(30) Foreign Application Priority Data
Oct. 12, 2010   (FR) ...................................... 10 58255

(51) Int. Cl.
*G02B 6/12* (2006.01)

(52) U.S. Cl.
USPC ........................................................... 385/14

(58) Field of Classification Search
None
See application file for complete search history.

(56) References Cited

U.S. PATENT DOCUMENTS

| 4,640,574 | A | * | 2/1987 | Unger | 385/14 |
| 4,760,569 | A | | 7/1988 | Mahlein | |
| 4,860,294 | A | * | 8/1989 | Winzer et al. | 372/7 |
| 4,923,271 | A | * | 5/1990 | Henry et al. | 385/37 |
| 6,501,891 | B2 | * | 12/2002 | Kawamoto et al. | 385/123 |
| 7,512,291 | B2 | * | 3/2009 | Mendoza | 385/12 |
| 2010/0092128 | A1 | | 4/2010 | Okayama | |

FOREIGN PATENT DOCUMENTS

WO    2005/012972 A1    2/2005

OTHER PUBLICATIONS

Search Report issued in French Patent Application No. FR10/58255 on May 6, 2011.

* cited by examiner

*Primary Examiner* — Sung Pak
(74) *Attorney, Agent, or Firm* — Vedder Price PC

(57) ABSTRACT

An optical duplexer intended to receive light at a first optical wavelength and to transmit back light at a second optical wavelength, including, on a substrate, successive layers forming a photoreceptor of the first optical wavelength, a selective filter letting through the first optical wavelength, and a waveguide having a surface including a grating which is transparent for the first optical wavelength and diffracting for the second optical wavelength.

6 Claims, 2 Drawing Sheets

NANOPHOTONIC OPTICAL DUPLEXER

BACKGROUND OF THE INVENTION

1. Field of the Invention

The present invention relates to the field of optical telecommunication networks, and more specifically to duplexers, that is, terminals capable of receiving an optical signal at a first wavelength and of transmitting back in controlled fashion optical signals at a second optical wavelength.

Such devices are for example used in telecommunication networks to receive, at the level of a subscriber terminal, a communication from a server via an optical fiber and to send adapted response signals to the optical fiber towards the server.

2. Discussion of the Related Art

As illustrated in FIG. 1, such duplexers have initially been formed by means of discrete components. An optical signal at a first optical wavelength $\lambda 1$, for example, 1.5 μm, is sent by an optical fiber 1 towards a subscriber terminal 2. The subscriber terminal comprises a splitter sending back the signal at the first optical wavelength to a receiver (REC) 4. The subscriber terminal also comprises an emitter (EM) 5, that may be controlled by an electronic control circuit 6, connected to receiver 4 to send back into the optical fiber, through splitter 3, a beam at a second optical wavelength $\lambda 2$, for example 1.3 μm.

As optical, microphotonic, and now nanophotonic integrated circuits have been developing, it has been attempted to form the entire data terminal 2 in the form of a monolithic integrated optical component. Various problems of coupling between the signal originating from the optical fiber and the receiver, and of coupling of the beam transmitted back to the optical fiber are then posed. Further, a crosstalk issue is raised, that is, there is a risk for a portion at least of the retransmitted beam to be sent to the receiver, thus disturbing the indications thereof.

Various integrated optical circuits have been provided in prior art and are mostly based on polarization splitting systems. However, such systems have a very poor efficiency. Generally, they have a coupling efficiency between an incident beam and a transmitted beam which is hardly greater than 20%.

Efficient duplexers made in the form of optical integrated circuits are thus needed.

SUMMARY OF THE INVENTION

An object of embodiments of the present invention is to provide a duplexer made in the form of an integrated optical circuit having a satisfactory coupling efficiency.

Another object of an embodiment of the present invention is to provide a method for manufacturing such a duplexer.

Thus, an embodiment of the present invention provides an optical duplexer intended to receive light at a first optical wavelength and to transmit back light at a second optical wavelength, comprising, on a substrate, successive layers forming a photoreceptor of the first optical wavelength, a selective filter letting through the first optical wavelength, and a waveguide having a surface comprising a grating which is transparent for the first optical wavelength and diffracting for the second optical wavelength.

According to an embodiment of the present invention, the photoreceptor is a PIN diode comprising a stack of semiconductor layers, respectively heavily P-type doped, intrinsic, and heavily N-type doped.

According to an embodiment of the present invention, the filter comprises an alternation of layers of high and low indexes.

According to an embodiment of the present invention, the layers of high and low indexes are silicon and silicon oxide layers.

According to an embodiment of the present invention, the waveguide comprises a silicon core surrounded with silicon oxide.

According to an embodiment of the present invention, the duplexer comprises a laser emitter coupled to the optical waveguide.

According to an embodiment of the present invention, the duplexer integrates in the substrate electronic components capable of controlling the emitter according to the signals received by the photoreceptor.

An embodiment of the present invention provides a method for manufacturing a duplexer such as hereabove, comprising the steps of successively forming, on a first silicon wafer, semiconductor regions, respectively heavily P-type doped, intrinsic, and heavily N-type doped, and coating the assembly with a planar bonding layer, forming on a second SOI-type wafer a grating in the upper silicon layer of the SOI structure, depositing successive layers forming a selective filter letting through the first optical wavelength and not the second optical wavelength and coating the assembly with a planar bonding layer, and bonding the surface opposite to the substrate of the first wafer to the surface opposite to the substrate of the second wafer and removing the silicon substrate of the second wafer.

According to an embodiment of the present invention, the planar bonding layers are silicon oxide layers.

The foregoing and other objects, features, and advantages of the present invention will be discussed in detail in the following non-limiting description of specific embodiments in connection with the accompanying drawings.

Figure 1:
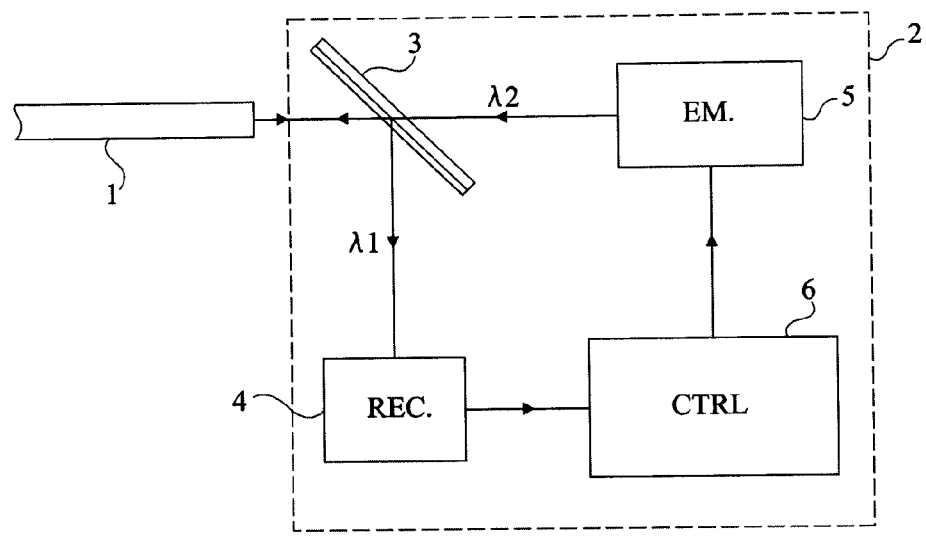
FIG. 1, previously described, shows a duplexer formed of discrete components.
Figure 2:
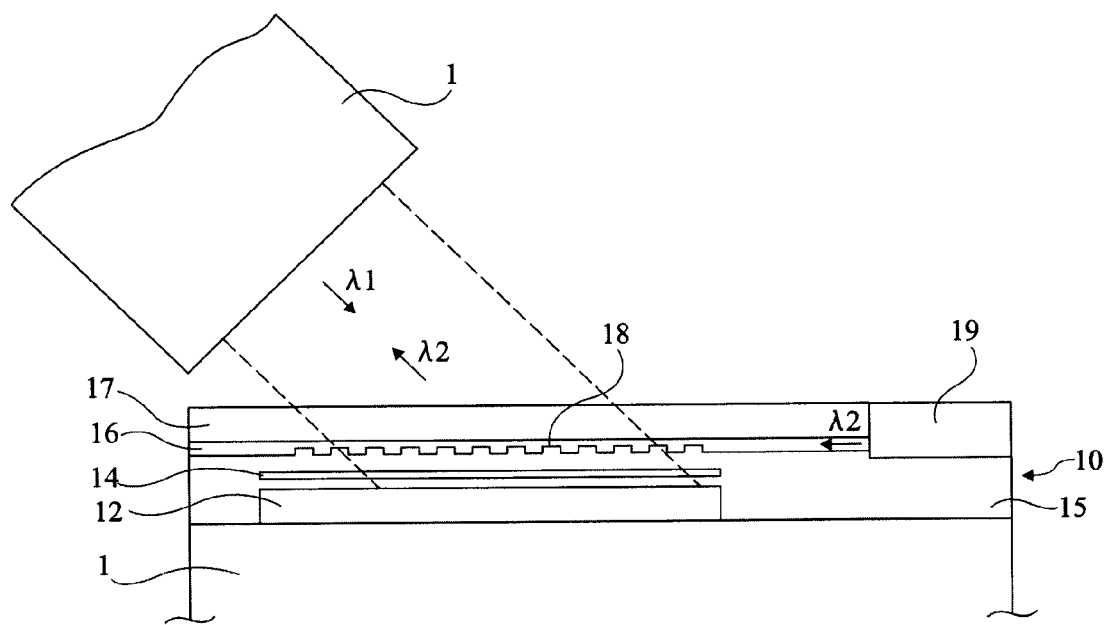
FIG. 2 is a simplified cross-section view of an integrated optical circuit forming an embodiment of a duplexer of the present invention.
Figure 3A:
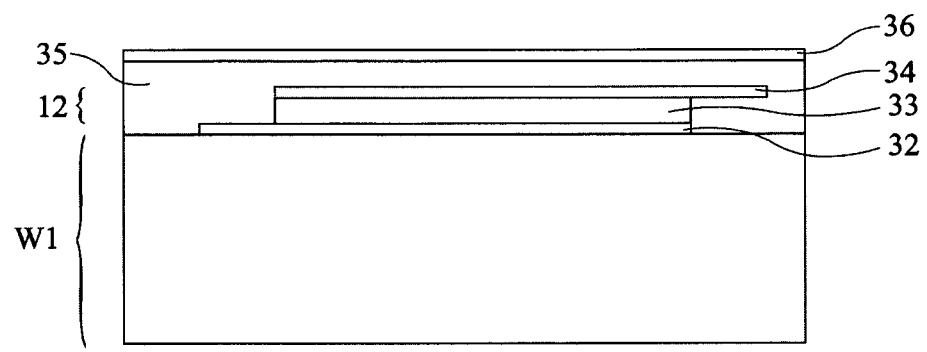
FIGS. 3A and 3B illustrate an example of a method for manufacturing a duplexer of the type in FIG. 2.
Figure 3B:
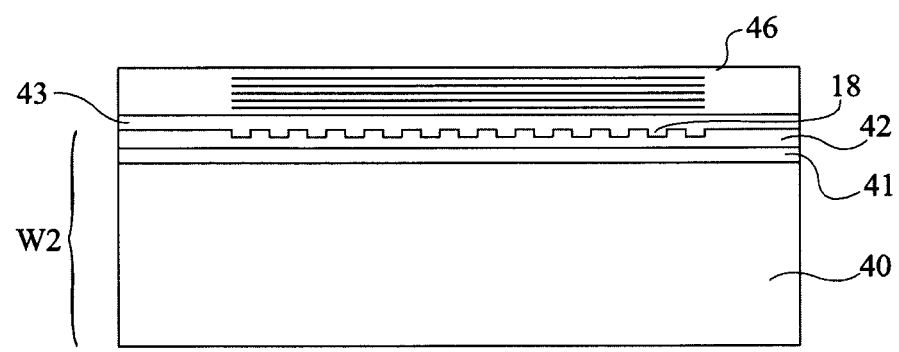

Conventionally, in the representation of the microcomponents of FIGS. 2, 3A, and 3B, the scale is arbitrarily expanded or reduced to make the drawings more readable.

DETAILED DESCRIPTION

FIG. 2 shows an optical fiber 1 sending an optical beam at a first optical wavelength $\lambda 1$ to an integrated optical circuit forming a duplexer 10. This optical fiber is also intended to receive an optical beam transmitted back at a second optical wavelength $\lambda 2$ by duplexer 10.

This duplexer comprises, on a substrate 1, a photoreceptor 12. The substrate may be a portion of a silicon wafer in which various integrated electronic circuits intended for the data processing are further formed. This photoreceptor is topped with a selective optical fiber 14 capable of letting through the first optical wavelength and of not transmitting the second optical wavelength. A neutral medium, for example, silicon oxide 15, surrounds the assembly of optical fiber 14 and of photoreceptor 12 and a portion of this medium may be inserted between photoreceptor 12 and filter 14. Above layer 15 is formed a layer delimited to define core 16 of an optical waveguide topped with a neutral layer 17, for example, silicon oxide. The assembly of layers 15 and 17 forms the waveguide cladding. A surface of the core of waveguide 16, here, the lower surface, is etched in a grating 18 to result in that a beam sent into this waveguide at a second optical wavelength λ2, for example, by a laser 19, is transmitted back towards optical fiber 1. Further, this grating is "transparent" for wavelength λ1. Thus, the beam at the first optical wavelength λ1 transmitted by optical fiber 1 crosses, practically with no interference, waveguide 16 and filter 14 to reach photodetector 12. Conversely, second optical wavelength λ2 transmitted in waveguide 16 is sent back to optical fiber 1. Possible stray radiations directed towards the photoreceptor are eliminated by filter 14.

The determination of a grating 18, which is active at the second optical wavelength to couple the waveguide to fiber 1 and which does not interfere with the first optical wavelength may be performed as to various parameters (period, etching depth, . . . ) by known methods. A finite-difference time-domain optimization (FDTD) such as described in C. Kopp. and A. Chelnokov's article "Fiber grating couplers for silicon nanophotonic circuits; Design modeling methodology and fabrication tolerances", Optics Communications 2009, may for example be used to determine the grating parameters and the distance of the filter on the grating. The FDTD is generally discussed on the Internet at address "http://en.wikipedia.org/wiki/Finite-difference_time-domain_method".

Optical filter 14 may be formed of the stacking of an alternation of layers of high and low refractive indexes. The succession of silicon (index n≈3.5) and silica (index n≈1.5) layers having their thicknesses given hereafter for the case where first wavelength λ1 is on the order of 1.5 μm and second wavelength λ2 is on the order of 1.3 μm, in the context of two examples, may for example be chosen.

FIRST EXAMPLE OF SUCCESSIVE FILTER LAYERS

Si: 195 nm
$SiO_2$: 203 nm
Si: 84 nm
$SiO_2$: 182 nm
Si: 64 nm
$SiO_2$: 138 nm
Si: 71 nm
$SiO_2$: 231 nm, and
Si: 96 nm

SECOND EXAMPLE OF SUCCESSIVE FILTER LAYERS $SiO_2$: 211 nm
Si: 85 nm
$SiO_2$: 214 nm
Si: 50 nm
$SiO_2$: 143 nm
Si: 77 nm
$SiO_2$: 253 nm, and
Si: 78 nm It has been determined that, for a filter according to one or the other of these two examples, the reflectivity on the transmitting band (1.3 μm) is very high, on the order of 99.4% while the reflectivity on the receive band (1.5 μm) is very low (lower than 15%). Thus, this filter will optically isolate the photodiode receiving the signal at 1.5 μm from the beam transmitted back at 1.3 μm. This filter will reinforce the efficiency of the grating coupling towards the fiber to more than 50% if this filter is arranged approximately 700 nm under the grating with silica layer 15 interposed between them. The described filter is a beam splitter and not a Bragg filter for which the optical thickness of the successive layers would be on the order of λ/4.

For the waveguide and the associated grating, the structure described hereafter may be used. Typically, the guide and the coupling grating at 1.3 μm will be formed in a silicon layer (index n=3.47) coated with silica (index n=1.44). Advantageously, this layer will be quasi-transparent at 1.5 μm while respecting the condition of a thin layer of thickness λ/2. Thus, noting TH the thickness of this layer, TH=λ1/2n for 1.5 μm.

It is shown that the transmission maximum at 1.5 μm is obtained for a thickness close to 220 nm, which corresponds to the selected thickness. Typically, the width of this guide will be 500 nm. Based on this thickness, the parameters of the grating of coupling towards the fiber are defined at 1.3 μm. One may select for the grating step or period Λ=480 to 560 nm, for an etch factor FF equal to from 0.4 to 0.6 times the thickness. The refractive index of core 16 of the silicon waveguide is 3.47. The refractive index of the cladding controlling the silica guide is 1.44, and the etch depth will range from 50 to 120 nm.

On the other hand, the grating will have dimensions greater than the diameter of the incident beam (approximately 10 μm) for a single-mode optical fiber, that is, for example, 10×10 μm². Thus, for Λ=510 nm, FF=0.5, and a silicon etch depth of 90 nm, a coupling efficiency close to 50% with a coupling angle (fiber angle with respect to the direction perpendicular to the grating plane) equal to 10° is obtained (which does not correspond to the angle illustrated in the drawing).

Photoreceptor 12 may especially be an avalanche photodiode or a PIN or NIP-type photodiode. A PIN-type photodiode comprises a heavily-doped P-type layer, a quasi-intrinsic layer, and a heavily-doped N-type layer. An NIP photodiode comprises similar layers, the conductivity types being reversed. The intrinsic layer may be made of germanium, InP, or InGaAs. The doped layers (with boron and phosphorus) may be formed from germanium, silicon, InP or InGaAs layers. Typically, the various layers of the PIN photodiode will be circular and will have diameters greater than the diameter of the incident beam (approximately 10 μm from the single-mode fiber). For example, the following values may be selected:

for the upper doped layer, boron-doped silicon having a 150-nm thickness and a 20-μm diameter, for the intrinsic layer, germanium having a 500-nm thickness and a 20-nm diameter, for the lower doped layer, phosphorus-doped silicon having a 150-nm thickness and a 30-μm diameter (this diameter is greater than the others to allow a contacting on the lower layer).

As concerns light source 19, it may be a controlled laser source formed on a gallium arsenide or indium phosphide chip embedded in the upper portion of the integrated circuit, so that its beam is directed towards optical waveguide 16. It may also be an external source. This source may be controlled by an electronic circuit integrated in substrate 1 and controlled by electronic signals especially resulting from the signals provided by photodetector 12.

FIGS. 3A and 3B are cross-section views intended to illustrate an example of manufacturing of an optical duplexer according to the present invention.

To form the duplexer in integrated circuit form, it is started from a first substrate W1, for example, a silicon wafer, on which a PIN photodiode comprising a lower heavily P-type doped layer 32, a central layer 33 of intrinsic doping, and an upper heavily-doped N-type layer 34 are formed. The entire structure is embedded in a silicon oxide layer 35, possibly formed by successive portions as layers 32, 33, 34 are being formed. The entire structure is preferably coated with a layer 36, for example, SiO$_2$, intended to provide the optical bonding of the structure of 3A to the flipped structure of FIG. 3B.

The structure of FIG. 3B is for example formed from a wafer W2 of silicon on insulator type (SOI) comprising a silicon substrate 40 coated with a thin insulating layer 41, currently made of silicon oxide, and with a thin silicon layer 42. The upper surface of silicon layer 42 is etched to form above-described grating 18. The assembly is coated with an interface layer, for example, a silicon oxide layer 43 and a succession of depositions such as mentioned hereabove as an example are performed to form an interference filter. The successive layers are illustrated in the drawing in the form of simple lines for simplification. The assembly is coated with a bonding layer 46.

Once the structures of FIGS. 3A and 3B have been formed, the structure of FIG. 3B is flipped and bonded to the structure of FIG. 3A and substrate 42 is removed. The structure shown in FIG. 2 is thus achieved. Of course, this is only a possible example of manufacturing of the structure according to the present invention.

Specific embodiments of the present invention have been described. Various alterations, modifications, and improvements will occur to those skilled in the art. In particular, it will be again underlined that the thicknesses have been arbitrarily expanded or reduced in the drawings but may easily be determined by those skilled in the art according to their general knowledge and to the indications given herein. Further, as shown in FIGS. 2, 3A, and 3B may possibly be a portion only of a large structure comprising other components. Connection areas will also be conventionally provided, especially on the upper surface and on the lower surface of the photodiode.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for manufacturing an optical duplexer intended to receive light at a first optical wavelength and to transmit back light at a second optical wavelength, the method comprising the steps of:
   forming on a first silicon wafer a photoreceptor of the first optical wavelength comprising semiconductor regions, respectively heavily doped of a first conductivity type, intrinsic, and heavily doped of a second conductivity type, and coating the assembly with a planar bonding layer,
   forming on a second SOI-type wafer, in the upper silicon layer of the SOI structure, a waveguide adapted to receive light at the second optical wavelength, having a surface comprising a grating which is transparent for the first optical wavelength and diffracting for the second optical wavelength and depositing successive layers forming a selective filter letting through the first optical wavelength and not the second optical wavelength and coating the assembly with a planar bonding layer, and
   bonding the surface opposite to the substrate of the first wafer to the surface opposite to the substrate of the second wafer and removing the silicon substrate of the second wafer.

2. The method of claim 1, wherein the filter comprises an alternation of layers of high and low indexes.

3. The method of claim 2, wherein said layers of high and low indexes are silicon and silicon oxide layers.

4. The method of claim 1, wherein the waveguide comprises a silicon core surrounded with silicon oxide.

5. The method of claim 1, wherein the planar bonding layers are silicon oxide layers.

6. The method of claim 1, comprising the step embedding in the second wafer a laser source formed on a gallium arsenide or indium phosphide chip in the upper portion of the integrated circuit, so that the beam from the laser source is directed towards the optical waveguide.

* * * * *